(12) United States Patent
Hottner

(10) Patent No.: US 6,716,778 B1
(45) Date of Patent: Apr. 6, 2004

(54) SEAM JOINING A WATERPROOF LAMINATE WITH TEXTILE LAYER MADE OF MULTI-COMPONENT YARNS

(76) Inventor: Martin Hottner, Sperberstr. 31, 83052 Bruckmühl (DE)

( * ) Notice: Subject to any disclaimer, the term of this patent is extended or adjusted under 35 U.S.C. 154(b) by 0 days.

(21) Appl. No.: 09/508,866

(22) PCT Filed: Oct. 1, 1998

(86) PCT No.: PCT/US98/20578

§ 371 (c)(1),
(2), (4) Date: Jul. 14, 2000

(87) PCT Pub. No.: WO99/16620

PCT Pub. Date: Apr. 8, 1999

(30) Foreign Application Priority Data

Oct. 1, 1997 (EP) ............................. 97117071

(51) Int. Cl.⁷ ........................... B32B 5/18; B32B 27/12; B32B 3/06; D03D 15/00; A41D 27/24
(52) U.S. Cl. ........................... 442/199; 442/76; 442/86; 442/88; 442/200; 442/201; 442/289; 442/311; 442/361; 442/363; 442/364; 428/57; 428/58; 2/275
(58) Field of Search ..................... 428/57, 58; 2/275; 442/85, 86, 88, 199, 200, 201, 289, 311, 361, 363, 364, 397

(56) References Cited

U.S. PATENT DOCUMENTS

| | | | | |
|---|---|---|---|---|
| 3,100,926 A | * | 8/1963 | Richmond | 156/148 |
| 4,194,041 A | * | 3/1980 | Gore et al. | 2/135 |
| 4,485,141 A | * | 11/1984 | Fujimura et al. | 264/45.9 |
| 4,555,293 A | * | 11/1985 | French | 2/275 |
| 4,604,152 A | | 8/1986 | Luikke | |
| 5,162,149 A | * | 11/1992 | Reaney | 428/315.5 |
| 5,244,716 A | | 9/1993 | Thornton et al. | |
| 5,529,830 A | | 6/1996 | Dutta et al. | |
| 5,569,507 A | * | 10/1996 | Goodwin et al. | 428/76 |
| 5,689,903 A | | 11/1997 | Aumann | |
| 5,804,011 A | | 9/1998 | Dutta et al. | |

OTHER PUBLICATIONS

JP 03–174051 Misao Taguchi (English Translation).*
Adanur, Sabit. Wellington Sears Handbook of Industrial Textiles. Technomic Publishing Co. Inc. 1995. p. 596–597.*
JP 03–174051, Toray Industries, Inc. Nov. 30, 1989 (Patents Abstract of Japan English Abstract).*
JP 03–174051, Toray Industries, Inc. Nov. 30, 1989 (Derwent English Abstract).*
DE 4244731, Ebert et al. May 8, 1992 (Derwent English Abstract).*

* cited by examiner

*Primary Examiner*—Cheryl A. Juska
*Assistant Examiner*—Jenna Leigh Befumo
(74) *Attorney, Agent, or Firm*—Kevin J. Boland

(57) ABSTRACT

The invention discloses a textile laminate (1, 400, 450) with a first layer (5) comprising a waterproof and preferably breathable functional layer (10, 20) and a second layer (30) comprising at least a first component and a second component. The first component is stable to a first temperature and the second component melts at a lower second temperature. In one embodiment of the invention, the first component is polyester and the second component may be a thermoplastic such as copolyester, polyamide, copolyamide or polyethylene. The textile laminate (1) is particularly advantageous when two of such laminates (1, 400, 450) have to be joined or fused together. In this case a waterproof seam is created at the seam (500) between the two laminates (1, 400, 500).

85 Claims, 5 Drawing Sheets

SEAM JOINING A WATERPROOF LAMINATE WITH TEXTILE LAYER MADE OF MULTI-COMPONENT YARNS

FIELD OF THE INVENTION

The invention relates to a seam formed between when two or more laminates are joined together.

PRIOR ART

High technology apparel garments made of waterproof textile laminates are state of the art. These laminates contain a waterproof, windproof and breathable membrane onto which is laminated at least one textile layer.

The joining together of two textile laminates present a problem if the seam at which the two textile laminates are to be sealed is to be made waterproof. Various methods have been tried. For example, W.L.Gore & Associates has developed a method in which two GORE-TEX® laminates are heat sealed at a seam using a GORE-SEAM® seam sealing tape.

The principles of sealing are well known. Generally, to get a sealed joint or a seam, a sealant, an energy source, and structural joining are required. There are a number of prior art methods which demonstrate this. The sealants available are numerous and can be added to the laminates or are part of the native materials. The energy sources which can be used for sealing are numerous and include, but are not limited to heated tools, radio frequency, thermal impulse, and ultrasonic welding methods. Under the proper conditions structural joining of the textile laminates will take place and a joint or seam will be formed.

The prior art discloses a number of seam-forming methods involving the fusion of a thin strip of thermoplastic material to bind two layers of textile materials together and thus form a seam. These are disclosed, for example, in U.S. Pat. No. 3,387,307 (Blatz) assigned to Handgards, Inc. A similar method is taught in GB-A-1 465 343 in which a thin thermoplastic strip is placed between two fabric pieces to form the seam. The use of this method results in a stiff seam being formed between the two fabric pieces.

Other prior art is known in which the laminates are adhered together using adhesives. European Patent EP-B-0 345 730 (Kleis) assigned to W.L.Gore & Associates GmbH teaches the use of adhesive beads to produce the seams in a glove or other clothing application. Glove insert products made according to this invention are available from W.L.Gore & Associates GmbH in Feldkirchen, Germany, under the trade mark DIRECT GRIP®. In order to ensure absolute waterproofness of the seams, it is necessary for the adhesive to penetrate the whole depth of the textile layer up to the membrane. In particular for voluminous textile layer, the seams have to be glued over a wide area. The seams thus produced are strong but relatively stiff and uncomfortable.

U.S. Pat. No. 5,003,902 describes a seam construction for use on protective clothing which involves overlapping the fabric pieces and bonding them together by use of a melt-adhesive film between them. A liquid-proof thread is sewn through the overlap in order to secure the two pieces of fabric to each other. The completed seam is then heated to melt-bond the adhesive film to the fabric pieces and to seal any apertures left by the sewing thread. The seams produced according to the teachings of this patent are also strong but relatively stiff and therefore uncomfortable to the wearer.

One of the problems encountered with these prior art seam sealing methods for waterproof laminates is that the seams have had to be fairly wide in order to ensure that the seams are waterproof. This results in a stiff seam which reduces the comfort of the garment to the wearer. In, for example, sock or glove applications, the width and/or the stiffness of the seams is particularly noticeable. Some attempts have been made at producing narrower seams. However, these have not been durably waterproof or softer because of the added sealant material.

It has been possible with prior art methods to construct narrower seams which are waterproof and flexible. However, these seams have proven to be weak in the transverse, i.e. cross-seam, direction. This weakness results in a lack of durable waterproofness.

U.S. Pat. No. 3,625,790 (Ayres) teaches a glove made of a non-breathable laminate of an elastic fabric and a thermoplastic layer. Two pieces of a laminate are welded together to form a glove in which the seams are formed by fusion of the thermoplastic layers using dielectric heating means. The use of electromagnetic waves at radio frequencies to form seams limited to those materials textiles which incorporate materials having dipolar molecules, such as polyvinyl chloride (PVC) or some polyurethanes (PU). This insert seam while flexible is not very strong. Particularly in manufacturing processes this is a severe disadvantage since the textile laminates have to be handled carefully in order to avoid damage.

Further prior art known to the inventors includes U.S. Pat. No. 4,545,841 (Jackrel) which teaches an insert that is formed by heat sealing and U.S. Pat. No. 5,036,551 (Dailey) which teaches a glove that is formed by heat sealing a laminate. In both these examples, the insert seam while flexible is not very strong.

The problem with the prior art examples in which sealant material is added to form the seam is that the seam whilst strong is not flexible, i.e. they feel stiff to the wearer. The use of these seams is thus limited because of the discomfort to the wearer, especially in those applications in which a close fit is required.

The problem with the prior art examples in which the sealant material is supplied from the native material is that the seams whilst flexible are weak. The use of these seams is limited because of durability in tough applications and, particularly in manufacturing processes this is a severe disadvantage since the textile laminates in which such seams are incorporated have to be carefully handled in order to avoid damage.

Further problems with prior art seams, such as those made from polyamide or polyester is that these materials tend to shrink when these materials are heated to their melt points. This causes the laminates to deform.

There is therefore a need for a strong, durable and flexible seam for tough end uses and close fitting applications.

SUMMARY OF THE INVENTION

It is therefore an object of this invention to improve the comfort of the seams in garments made of waterproof laminates.

It is furthermore an object of this invention to reduce the width of the seams in garments made of waterproof laminates.

It is therefore an object of this invention to produce long-lasting, durable seams in garments made of waterproof laminates.

It is furthermore an object of the invention to provide seams which are both strong and flexible.

It is furthermore an object of the invention to provide seams which are strong in the transverse (cross-seam) directions.

A further object of the invention is to provide seams which have a low shrinkage.

A further object of the invention is to provide seams which have a high stretch.

It is preferred that the laminates from which the seams are to be made are breathable, i.e. water vapour permeable.

These and other objects of the invention are solved by providing a laminate with a waterproof and preferably breathable functional layer on which is laminated a second textile layer comprising at least a first component and a second component, preferably in the form of a conjugate fibre. The first component is made of a material which is stable to a first temperature and the second component is made of a material which melts at a second temperature. The first temperature is higher than the second temperature. Such a laminate can be supplied with energy, e.g. by heating, to reach a temperature higher than the second temperature but lower than the first temperature. The second component melts and provides sealant material (adhesive) for joining the laminate to another substrate or a laminate.

Both the first component and the second component participate in the structural joint. The second component encapsulates the first component whilst the first component remains stable. The second component provides the waterproof barrier and the first component provides structure and strength to the seam.

Using these laminates, it is not necessary to use an additional thermoplastic strip to provide adhesive material to form the seam. Rather the material of the laminate (the native material) forms the seam itself. This leads to a reduction in manufacturing complexity of the seam and a reduction in seam bulk thus reducing the stiffness of the seam and increased comfort to the wearer. There is also an improvement in the assembly at the factory making, for example, gloves with seams of the invention since these seams are more tolerant of external stresses.

The seams formed by this laminate are found to be high in transverse seam strength and longitudinal strain and also to be flexible.

Such laminates are known from U.S. Pat. No. 5,662,978 (Brown et al.) assigned to Kimberly-Clark Worldwide, Inc., and in which conjugate spunbound fibres of polypropylene and polyethylene are used to form a non-woven textile layer. This textile layer is laminated to a polyolefin film, particularly polyethylene. The laminates formed according to the teachings of this patent are used for manufacturing a protective covers and not for the production of articles of clothing. There are no teachings in this patent that the laminate of this invention can be used to form comfortable and hard-wearing seams, such as those used in the production of articles, e.g. articles of clothing.

A similar laminate is further known from U.S. Pat. No. 5,503,907 (Gessner) assigned to Fiberweb North America, Inc., in which a non-woven textile layer of multi-component fibres is laminated to a microporous layer. The lower melting component of the multi-component fibre taught in this patent application is used to form the bond of the textile layer with the microporous layer. The higher melting component retains its substantially continuous fibrous form to provide a strengthening and reinforcing function in the laminate. There are no teachings in this patent concerning the production of seams from laminates used, for example, in clothing applications.

Similarly German Patent DE-C-196 32 312 (Tebbe) teaches a glove made of a laminate of a polypropylene foil onto which is laminated a textile layer of cotton or cellulose. The textile layer further includes polypropylene fibres in a blend in order to improve the adhesion between the polypropylene foil and the textile layer. The glove is made by welding two pieces of laminate cut on the polypropylene foil side into glove shapes together by radio frequency welding. In this example, the textile layer is placed on the exterior of the glove and the polypropylene foil is on the inside of the glove. The textile layer thus does not participate in the welding together of the two textile laminates.

The seams formed from the laminates of the invention are sufficiently waterproof that they are able to withstand a water entry pressure of at least 0.07 bar and preferably at least 0.13 bar according to the suter test described below. Furthermore the seams are strong and flexible as demonstrated by the stiffness tests and the Instron tests below.

In the laminate, the second (low melting point) component is preferably meltable at a temperature in the range from 80° C. to 170° C. whilst the first (high melting point) component is stable to a temperature of at least 140° C. For a reliable seam to be formed the difference in temperature between the first temperature and the second temperature is at least 20° C.

In one embodiment of the invention, the second layer further includes a propellant or foaming agent which is activatable by activation means. On activation this propellant produces a gas which in combination with the melted second component provides a foam-like substance with closed cells. The closed cells ensure that the seam remains waterproof but the seam is resilient but also "spongy" and thus soft. The seam is therefore comfortable for the wearer of apparel made from the laminate.

According to one embodiment of the invention the second layer is composed of a plurality of yarns in the form of strands, filaments, threads or fibres. The second component in the second layer is a thermoplastic which is selected from the group of thermoplastics comprising co-polyester, polyamide, co-polyamide or polyolefin. In the preferred embodiment of the invention the second component is a polyethylene a polyamide 6.0.

The first component is selected from the group of polymers comprising cellulose, protein fibers including wool and silk, polyolefins including polypropylene and polyethylene, polyester, co-polyester, polyamide or co-polyamide. Preferably the first component is polyamide 6.6.

The yarn in the second layer is in one embodiment a conjugate fibre comprising the first component and the second component. A conjugate fibre having two components is sometimes termed a bi-component fibre. Suitable bi-component structures for use in the invention include an eccentric-sheath-core configuration, a concentric sheath-core configuration, wherein the second component forms the cover, an "island-in-sea" configuration, a wedge-core configuration, a wedge configuration or a "side-by-side" configuration. In the preferred embodiment of the invention, the fibre used has a sheath-core configuration.

In the embodiment of the invention with a propellant, the propellant is activated at a third temperature, the third temperature being intermediate between the second temperature and the first temperature. The propellant can be an integral part of the second component and is selected from the group of propellants consisting of azodicarbonamide, ammonium hydrogen carbonate, toluolsulfohydrazin or diazoaminobenzol. In the preferred embodiment of the invention the propellant is azodicarbonamide.

The functional layer included in the laminate is a membrane or a film. The functional layer is selected from the group of materials consisting of polyester, polyamide polyketone, polysulfones, polycarbonates, fluoropolymers, polyacrylates, co-polyetheresters, co-polyetheramides, polyurethane, polyvinylchloride (PVC), polytetrafluoroethylene or polyolefins Preferably the functional layer is made from expanded PTFE. Expanded PTFE is known to be very waterproof and highly breathable. It provides the laminate with an water vapour transmission rate of less than 150 $(m^2.Pa)/m$ and a water entry pressure of greater than 0.13 bar.

The invention also provides a method for sealing detected pinholes in waterproof laminates by allowing one component in the textile layer to be melted to flow and seal the detected pinhole.

DEFINITIONS OF TEST METHODS

Waterproofness

Figure 1:
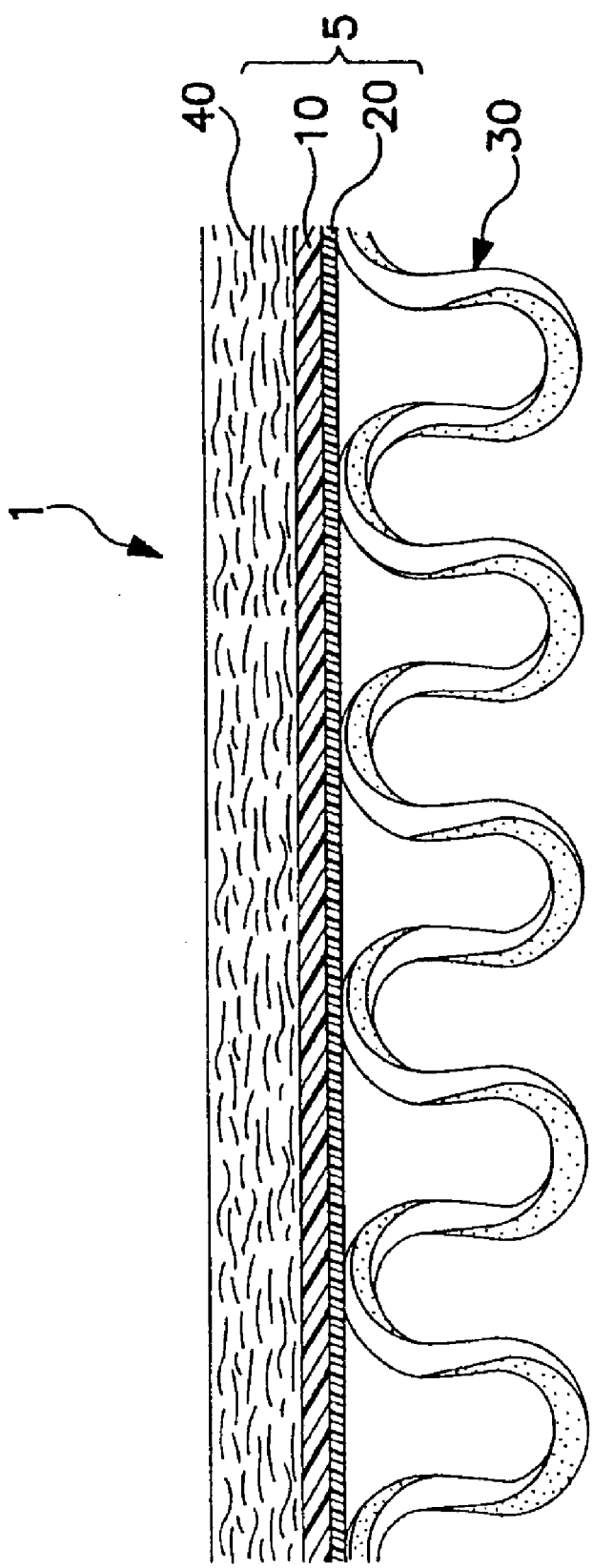
FIG. 1 shows the textile laminate of the invention.

Waterproof as used herein is meant having water-penetration-resistance (hydrostatic resistance) of 0.13 bar or more. This measurement is carried out on laminates by placing a test sample of the laminate with an area of 100 $cm^2$ under increasing water pressure. For this purpose, distilled water with a temperature of 20±2° C. is used and the rate of increase of the water pressure was 60±3 $cmH_2O$/min. The water penetration resistance of the sample is then the pressure at which water appears on the opposite side of the sample. The exact method of carrying out this test is given in the ISO Standard No. 811 from 1981.

The measurement is carried out on seams by the so-called suter test in which a test sample of the laminate including the seam is stretched over a holder. Distilled water with a temperature of 20±2° C. was placed under a pressure of 0.13 bar on one side of the seam and the test sample left for at least three minutes. The other side of the seam was investigated using a filter paper to see whether water penetration through the seam had occurred.

Water Vapour Permeability, i.e. Breathability

Water vapour permeable as used herein is meant having a water-vapour-transmission rate (Ret) of under 150 $(m^2.Pa)$/W. The water vapour transmission rate is measured using the Hohenstein MDM Dry Method which is explained in the Standard-Prüfvorschrift (Standard Test Rules) No. BPI 1.4 dated September 1987 and issued by the Bekleidungsphysiologisches Instituts e.V. Hohenstein, Germany.

Weight of the Fabric

The weight of the fabric was determined using a 2.54 cm×7.63 cm sample which had been conditioned at 24±2° C. and 65±2% relative humidity prior to testing. In the sampling pattern used, five specimens of the raw goods or three specimens of the laminate and laminate with seams were tested and the mean of the results together with the standard deviation was calculated. Any balance accurate to 0.01 g with a draft cover can be used. Further details of the test method are given in ASTM D 3776-96 Option C.

Thickness of the Seam

The so-called Snap Gauge Method was used according to ASTM D 1777-64 (re-approved 1975) using a Peacock 20-360 Snap Gauge (M-213) tester. A specimen of at least 2.54 cm×7.62 cm was used which been conditioned at 24±2° C. and 65±2% relative humidity prior to testing. The presser foot of the tester was lowered onto the specimen without impact. After five seconds a reading was taken. In the sampling pattern used, the thickness was measured at three locations along the length of the specimen and the three readings averaged in order to obtain the thickness of the seam.

Width of Seam

The width was measured along the length of a specimen in three locations and averaged to get the seam width for that specimen. Three specimens were tested and the mean of the three results was calculated. The width was measured to the nearest mm using a scale.

Length of the Seam

The length was measured on each specimen. Three specimens were tested and the mean of the three results was calculated. The length was measured to the nearest mm using a scale.

Shrinkage of Seam

The percent seam shrinkage was calculated using the following formula:

$$\% \text{ shrinkage}=(1-(\text{seam area/theoretical seam area}))*100 \%.$$

The seam area is seam width multiplied by the seam length. The theoretical area is for the foot print of the Theller heat seal machine. The foot print used was 12 mm by 131 mm.

Strength of Seam

This was measured using a an Instron 1122 Tester using 1" (2.54 cm) jaw faces connected to a computer. Three 7.62×2.54 cm samples were cut from the seam. The samples were conditioned at 24±2° C. and 65±2% relative humidity prior to testing.

Cantilever Stiffness Test

This is carried out using an FRL Cantilever Tester with samples in which the longer edge is laid parallel to the test direction. Prior to testing, the seam width (in mm) and the seam thickness (in mm) were measured using the methods described above. The specimens are conditioned at 24±2° C. and 65±2% relative humidity prior to testing. The angle indicator is 41.5°. After switching the apparatus on the movable weight will move to the right until the sample bends sufficiently to reach the indication bar at which point the apparatus is switched off and the length of the overhang measured. The flex stiffness (G) is then calculated from the following formula:

$$G=L/(W*T)$$

in which L=length of overhang (cm), W=width of seam (mm), and T=thickness of seam (mm).

Three specimens manufactured in the machine direction (i.e. along seam) and three specimens manufactured in the transverse direction (i.e. cross seam) were measured and the average calculated. The seam was oriented within the cantilever tester in both cases in the same direction.

Functional Layer

The term functional layer is used to denote a layer which had the properties that it is both waterproof and water-vapour permeable.

Yarn

The term yarn in the description is used to describe the continuous strands of material which are made into the textile. It includes strands, filaments, fibres and the like.

DETAILED DESCRIPTION OF THE INVENTION

FIG. 1 shows a textile laminate 1. The textile laminate comprises a composite layer 5 formed from a porous polymeric layer 10 and a continuous non-porous hydrophilic water vapour permeable polymer layer 20. On the first side of the composite layer 5 a bicomponent strand layer 30 comprising one or more bicomponent yarns is placed and on the second side of the composite layer is a backer fabric 40 is placed.

The porous polymeric layer 10 used in this invention is a microporous polymer membrane having a microscopic structure of open, interconnecting micro voids. It exhibits air permeability and as such imparts, or does not impair, water vapour permeability. The microporous membrane used in the laminate 5 described herein is typically of a thickness of 5 $\mu$m to 125 $\mu$m, most preferably of the order of about 5 $\mu$m to 25 $\mu$m. The useful polymers of the microporous membrane material include plastic polymers as well as elastomeric polymers. Examples of suitable polymers include polyesters, polyamide, polyolefins, polyketones, polysulfones, polycarbonates, fluoropolymers, polyacrylates, polyurethanes, co-polyetheresters, co-polyetheramides and the like. The preferred polymers are plastic polymers.

The preferred microporous polymer membrane material is expanded microporous polytetrafluoroethylene (PTFE). These materials are characterised by a multiplicity of open, interconnecting microscopic voids, high void volume, high strength, soft, flexible, stable chemical properties, high water vapour transfer and a surface that exhibits good contamination control characteristics. U.S. Pat. No. 3,953,566 and U.S. Pat. No. 4,187,390 describe the preparation of such microporous expanded polytetrafluoroethylene membranes and are incorporated herein by reference.

The continuous water vapour permeable polymer layer 20 is a hydrophilic polymer. The hydrophilic layer selectively transports water by diffusion but does not support pressure-driven liquid or air flow. Therefore moisture, i.e. water vapour, is transported but the continuous layer of the polymer precludes the passage of such things as air-borne particles, micro-organisms, oils or other contaminants. This characteristic imparts to the textile including the polymer layer 20 and in turn to articles made from it, such as socks or gloves, good contamination control characteristics by functioning as a barrier to contaminants of all sizes. Furthermore the water vapour transmitting characteristics of the material allow for comfort characteristics to the wearer.

The continuous water vapour permeable polymer layer 20 is typically of a thickness of between 5 $\mu$m and 50 $\mu$m, preferably between about 10 $\mu$m and 25 $\mu$m. This thickness has been found to be a good practical balance to yield satisfactory durability, continuity and rate of water vapour transmission.

Although not limited to them, the continuous water-vapour permeable polymers At most useful herein are those of the polyurethane family, the silicone family, the co-polyetherester family or the co-polyetherester amide family. Suitable co-polyetherester hydrophilic composition may be found in the teachings of U.S. Pat. No. 4,493,870 (Vrouenraets) and U.S. Pat. No. 4,725,481 (Ostapachenko). Suitable hydrophilic compositions are described in U.S. Pat. No. 4,2340,838 (Foy et al.). Suitable polyurethanes maybe found in U.S. Pat. No. 4,194,041 (Gore). A preferred class of continuous, water vapour permeable polymers are polyurethane, especially those containing oxyethylene units, such as described in U.S. Pat. No. 4,532,316 (Henn). Typically these materials comprise a composition having a high concentration of oxyethylene units to impart hydrophilicity to the polymer. The concentration of oxyethylene units is typically greater than 45% by weight of the base polymer, preferably greater than 60%, most preferably greater than 70%.

Figure 2:
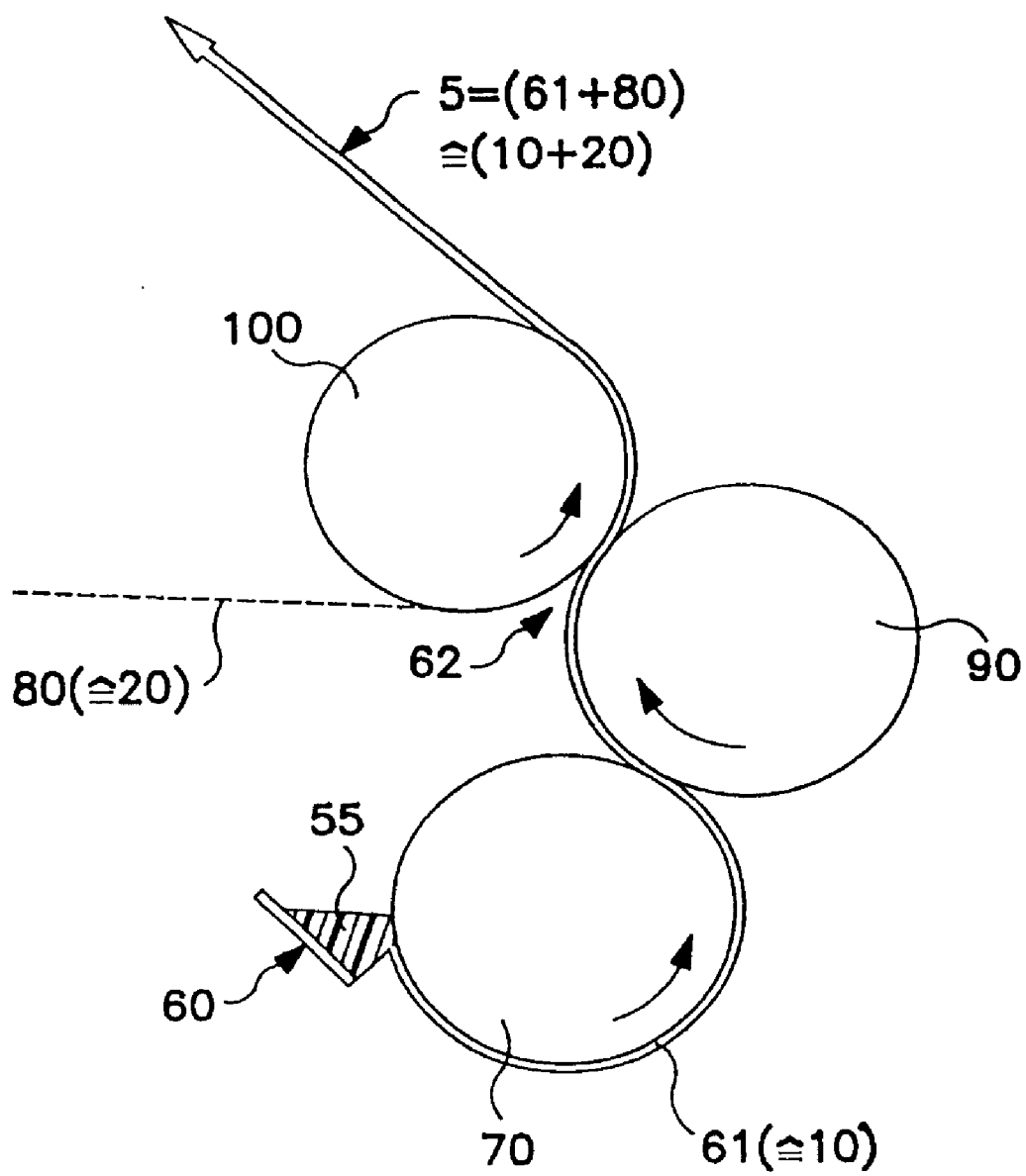
FIG. 2 shows a method of manufacture of the composite layer of the textile laminate.

The composite layer 5 used to make the laminate 1 can be prepared according to the teachings of U.S. Pat. No. 5,026,591 (Henn et al.). This method is illustrated but not limited to the following description of a four roll stack as shown in FIG. 2. Metered control of the molten water vapour permeable polymer 55 is provided for by a gravure roll 70 and a doctor blade/polymer reservoir 60. The water vapour permeable polymer 55 is applied as a thin, continuous liquid film 61 to the continuously moving porous polymer membrane 80 in the nip 62 between two rotating rolls 90, 100; the first one of the rotating rolls 90 having been coated with the liquid polymer and the second one of the rotating rolls 100 providing support so as to force the liquid polymer partially into the porous structure of the polymer membrane 80.

The textile laminate 1 is preferably provided with a backer fabric 40. The backer fabric 40 may be either woven, non-woven or knitted and may be made from a wide variety of materials such as polyester, polyamide (Nylon), polyolefins and the like.

Figure 3:
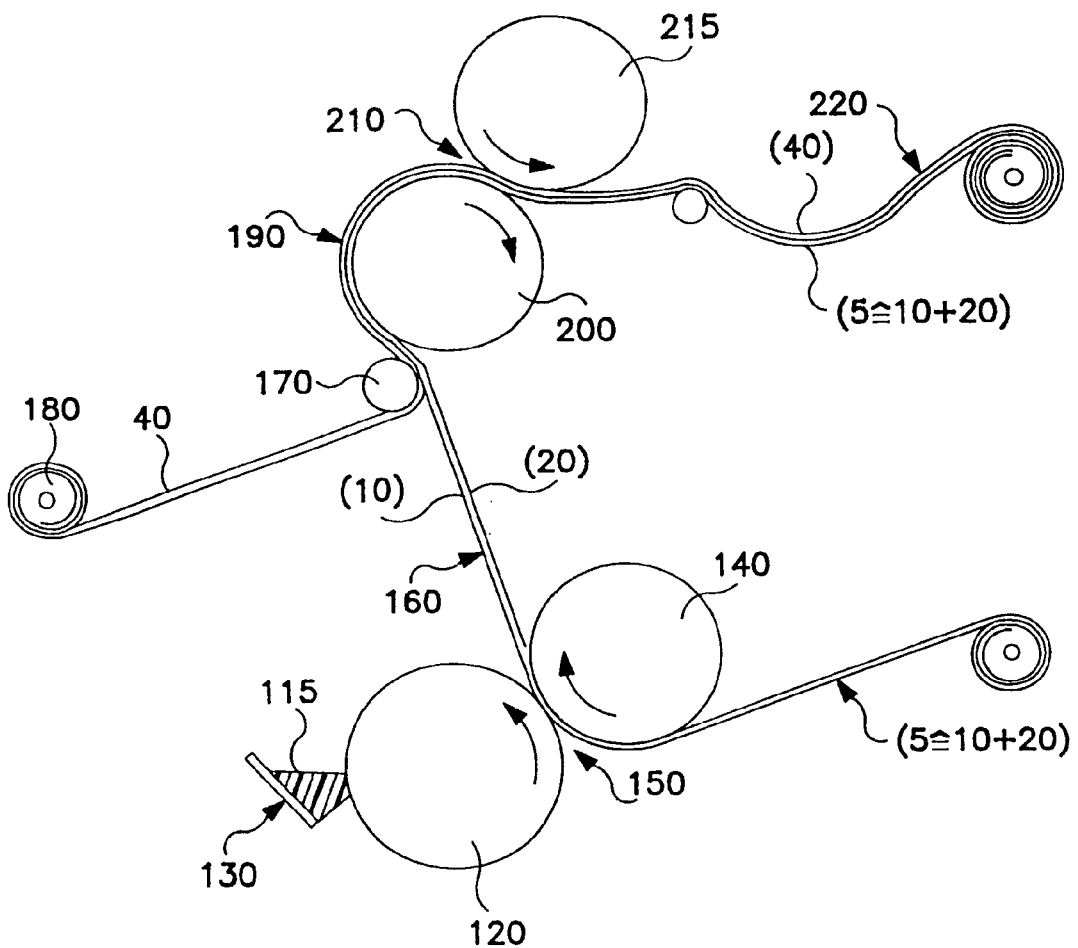
FIG. 3 shows a method of lamination of textiles onto the composite layer of the textile laminate.

The backer fabric 40 is laminated to the second side of the composite layer 5 by a standard lamination process such as that shown in FIG. 3. In the process, a dot pattern of heat-curing adhesive 115 from a doctor knife/adhesive reservoir 130 is metered onto the second side of the composite layer 5 by a gravure roll 120. The composite layer 5 is held under minimal tension against the gravure roll 120 by a low durometer rubber roll 140 at a pressure sufficient to effect removal of the adhesive dots onto the second side of the composite layer 5.

On exiting a printing nip 150, the adhesive dot coated composite layer 160 is brought to a laminating roll 170 where it is brought in intimate contact with the backer fabric 40 provided from a storage roll 180. The laminate 190 created by the uncured adhesive is then wrapped around a heating roll 200 and heated to a temperature suitable for curing the adhesive, e.g. around 125° C. Upon exiting the nip 210 between the roll 200 and a pressure roll 215, the laminate 220 is taken up on a storage roll 230.

The bicomponent layer 30 is a woven, non-woven or knitted textile layer made from strands, filaments, threads or fibres having at least two components. The first component is a material which is stable, i.e. does not melt or otherwise disintegrate, to a high temperature, e.g. around 230° C. The second component is a material with a low melting temperature, e.g. around 110° C. The two components in the bi-component layer may be made up of two different types of strands, filaments, threads or fibres. More preferably, a bi-component yarn is used. The bi-component yarn may have either a core-sheath structure an "island-in-the-sea" structure or a "side-by-side" structure. Table 1 shows a number of possible bi-component yarns which may be used in this invention.

TABLE 1

| Supplier/ Trade Name | Polymers low/high | melting temperature of low melt component | structure/ construction |
| --- | --- | --- | --- |
| Hoechst/ Celanese (Trevira "V 721– 724") | Co-PET/PET, PE/PET, PP/PET, PA12 or 6/PET PBT | 130 or 170° C. 127° C. 166° C. 178 or 221° C. 227° C. | Bicomponent filament (sheath/core) or filament bend |
| Hänsel/Spunfab | Co-PA, Co-PET 100% | 95–170° C. | Monofil/melt blown 100% low melting |
| Far Eastern Textile ("EASTLON") | PE/PP, PE/PET, Co-PET/PET | 130° C. 190° C. | sheath/core 10–70% low melting |
| (Du Pont) | PA 6/PA 6.6 | 218° C. | sheath/core |
| EMS-Chemie ("GRILON") | Co-PA/PET | 85 or 140° C. (monofil.) 85–160° C. (multifil.) | PET-core (20%), Co-PA-sheath (80%) or 100% low melting |
| Danaklon "AL-Adhesion-C fibres" | PE/PP | 125–145° C. | sheath/core |

It should be noted that it is difficult to define an exact melting point for polymers. A better term would be to use the expression melting range as indicated in the above table. The term melting point is used in the context of this application to describe the temperature above which the polymer flows sufficiently to form a seam.

The bi-component layer 30 is described in this description as having two components. It should be note that the bi-component layer 30 may be replaced by a tri-component layer containing three components or a multi-component layer containing a plurality of components. More generally such multi-component layers are made from conjugate fibres as known from U.S. Pat No. 5,662,978 Brown et al).

The bi-component layer 30 is laminated onto the first side of the composite layer 5 or onto the porous polymeric layer 10 by a lamination process similar to that described above with reference to FIG. 3. Care must be taken during the lamination process that the low melting temperature component does not melt during lamination of the bi-component layer 30 onto the composite layer 5.

The bi-component layer 30 may additionally include a propellant which produces a gas when activated. Known means for activating the propellant are either heating the activation means or irradiating the propellant by, for example, an electron beam or high frequency electromagnetic radiation. After activation of the propellant and melting of the second low melting temperature component, the gas produced by the propellant produces in combination with the melted low melting temperature component a closed-pore foam as will be described later. Known propellants which may be used in the invention are azodicarbonamide (ADC), ammonium hydrogen carbonate ($NH_4CO_3$), Toluolsulfohydrazin (TSH) or Diazoaminobenzol.

Several methods are known for ensuring that the propellant is inserted into the layer.

In the first method, the propellant is added to the master batch from which at least one of the fibres forming the bi-component layer 30 is to be spun. The blend of propellant and fibre material is subsequently spun conventionally using a nozzle.

A second method includes adding the propellant as a powder to the spinning extruding in the nozzle prior to the spinning of one of the fibres forming the bicomponent layer 30. In both the first and second method, the propellant is evenly distributed throughout the cross-section of the fibre. The propellant is thus integrally incorporated within the fibre.

A third method involves coating a monofilament or a multifilament yarn as it passes a nozzle. An extruder presses a hot melt containing a propellant which flows around the yarn and coats the yarn. Using this method only the outside of the yarn is coated with the propellant.

In the preferred embodiment of the invention, the propellant is heat-activated and the activation temperature is chosen to be at least around 20° C. higher than the melting temperature of the low melting temperature component. The activation temperature is furthermore chosen to be substantially below the melting temperature of the high melting temperature component.

Figure 4:
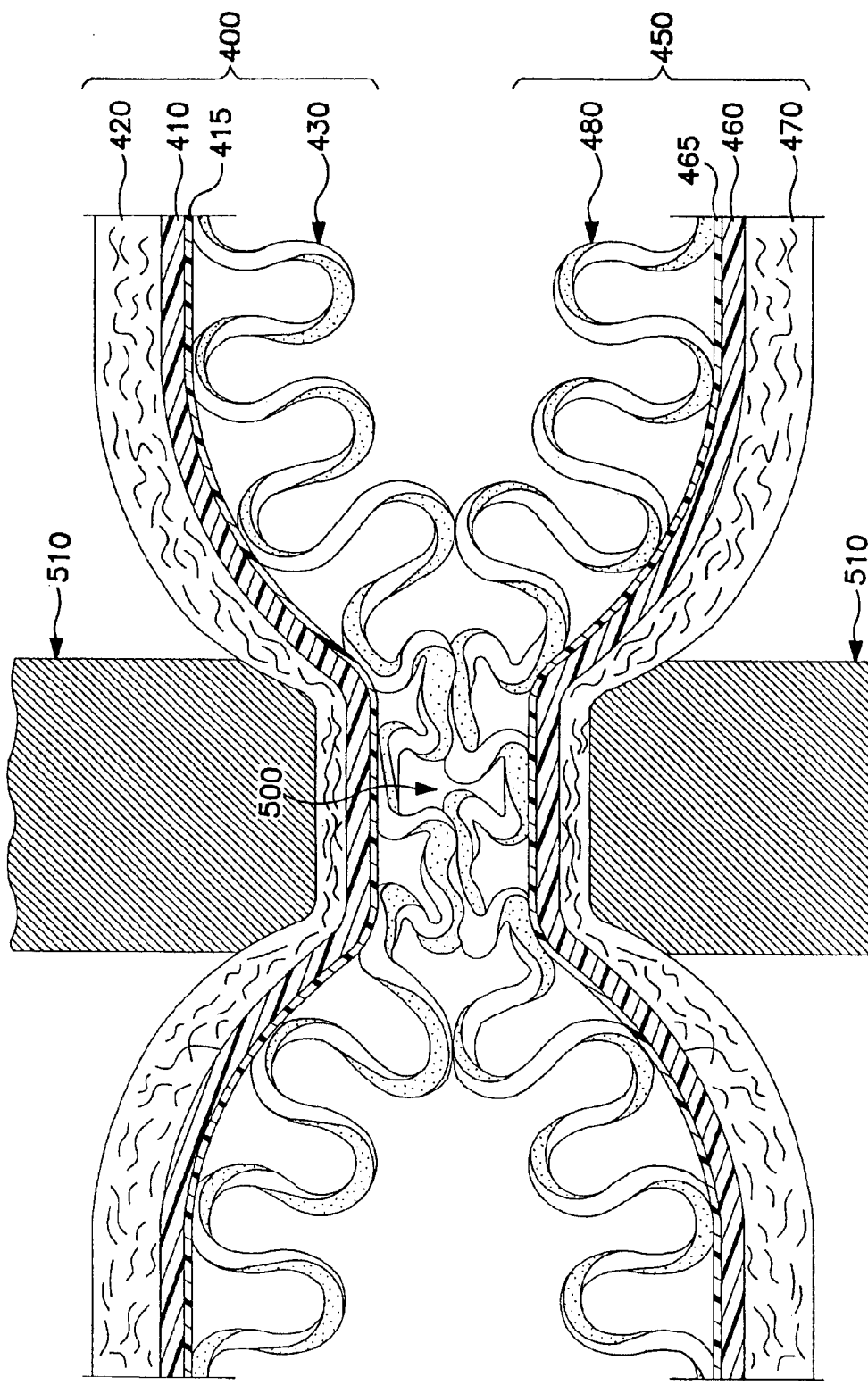
FIG. 4 shows the method of formation of a seal between two textile laminates according to the invention.

The textile laminate 1 is particularly useful in applications in which two textile laminates have to be joined or fused together as is illustrated in FIG. 4. In this example a first textile laminate 400 is to be joined to a second textile laminate 450. The first textile laminate 400 comprises a first composite layer 410 including a porous polymeric layer 415, a first backer fabric 420 laminated to the second side of the first composite layer 410 and a first bi-component layer 430 laminated to the first side of the first composite layer 410. The second textile laminate 450 comprises a second composite layer 460 including a porous polymeric layer 465, a second backer fabric 470 laminated to the second side of the second composite layer 460 and a second bi-component layer 480 laminated to the first side of the second composite layer 480. The first textile laminate 400 is to be joined at a seam 500 to the second textile laminate 450 using a heat seal die 510. The heat seal machine used was a Theller Heat seal machine which is available from Theller Engineering in Petaluma, Calif., USA.

Alternatively ultrasonic welding can be used in order to form the seams 500. For example a Branson Ultrasonic Sealer available from Branson Ultrasonics Corporation of Danbury, Conn., USA, is used.

The optional use of the propellant to create a foam at the seam 500 creates a seam which is both substantially waterproof and imparts improved hand to the seam 500.

In FIG. 4, it should be observed that the bi-component layers 430 and 480 are depicted immediately before melting.

The temperature of the heat seal die is chosen to be greater than that of the melting temperature of the second low melting temperature component of the bi-component layers 400 and 450 but to be below the melting temperature of the first component of the bi-component layers 430 and 480. Typically the heat seal die is at a temperature of between 130° C. and 215° C. A pressure of 60 psi–300 psi and a dwell time of between 1 s and 20 s are used. Under these conditions, the low melting temperature components in the bicomponent layers 430 and 480 melt and, due to the pressure exerted on the textile laminates 400 and 450 by the heat seal die, the bicomponent layers 430 and 480 fuse together.

The low melting component fills the gaps in the bicomponent layer 430 ad between the structure formed by the fibres having a higher melting temperature. The higher melting temperature fibres serve therefore two functions. Firstly they provide mechanical strength to the seam. Secondly they act as a "gap-keeper" or spacer to ensure that the lower melting temperature fibres in the molten state to not seep out of the seam 500.

The width of the seam 500 formed is between 0.5 mm and 1.3 cm.

If a propellant is included in the bi-component layer 430, 480, then this is activated by the heat produced by the heat seal die and a closed cell foam is produced at the seam 500. Temperature is applied to a sufficiently wide area of the seam 500 for a sufficient length of time to ensure that the seam is watertight. Typically the seam would have a width of 1–3 mm and the temperature would be applied at 190° C. for 1–10 seconds.

The function of the two components in the bi-component layers 430 and 480 can be easily understood from FIG. 4. The first component provides mechanical strength to the seam 500 since it neither melts nor otherwise disintegrates at the temperature to which the seam 500 is subjected by the heat seal die 510. The second (low melting temperature) component provides the adhesive between the two laminates 400 and 450. If a propellant is used, then the second component together with the first component provides the walls of the cells of the closed-pore foam with sufficient strength to carry any load to which the seam 500 is subjected. Furthermore, the second component imparts sufficient wall strength to the individual cells to prevent them from connecting with each other to prevent them from providing a leak path through the seam 500 during flexing of the laminates 400, 450.

Another method of adding energy to the bi-component layers 430, 480 to form the seam 500 is to use ultrasonic welding techniques to heat up the components.

In the examples given below the weight of the bi-component layer 30 is generally between 0.7 and 1.0 osy. It would be possible to use bi-component layers of higher weight in which case it would be expected that the seam strengths would increase since more native material is available to form the seam 500 and also more material is available to provide structure to the seam 500. The first and second backer fabrics 420, 470 have weights which are typically between 0.5 osy and 5.5 osy. Different proportions of each component can be used. It is thought that a minimum of 30% by volume of the second component should be present and a maximum of 70% by volume.

An advantage of using the propellant to form the close-cell foam is that the seam thus created is substantially more flexible and softer to touch than a seam formed without the foam created by the molten second component with the propellant.

The seam is deemed to be waterfight when the water entry pressure of the seam is greater than 0.13 bar when measured using the suture test as explained above.

In the example illustrated in FIG. 4, it is assumed that the bi-component layers 430 and 480 are fused to each other.

Figure 5:
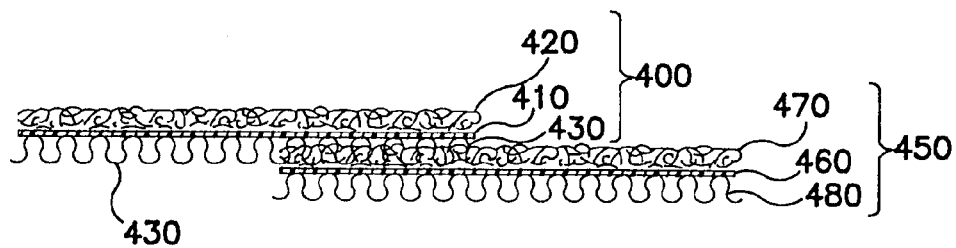
FIG. 5 shows an embodiment of the invention in which the bicomponent layer is fused to the backer fabric.

It is also possible to fuse a bi-component layer 430, 480 directly to one of the backer fabrics 470 or 420 as is shown in FIG. 5 in which the components of the textile laminates are given the same numerals as their counterparts in FIG. 4. Use of the propellant in this example has the advantage that the molten second component is "blown" into the backer fabric 420, 470, thus creating a substantially more watertight seam.

Figure 6:
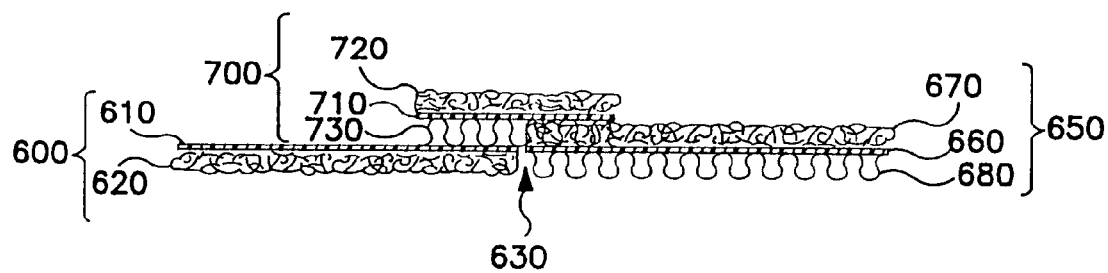
FIG. 6 shows an embodiment of the invention in which the textile laminate is used as a seam sealing tape.

A further application of the invention is depicted in FIG. 6 in which a two layer textile laminate 600 comprising a composite layer 610 and a backer fabric 620 is to be joined to a three layer textile laminate 650 with a composite layer 660, a first backer fabric 670 on a first side of the composite layer 660 and a second backer fabric 680 on a second side of the composite layer 660. A seam 630 between the two layer textile laminate 600 and the three layer textile laminate 650 is sealed by a tape 700 made from the textile laminate according to the invention. The textile laminate has a composite layer 710 with a backer fabric 720 on the side of the composite layer 710 facing away from the seam and a bi-component layer 730 on the side of the composite layer 710 facing the seam 630.

Figure 7:
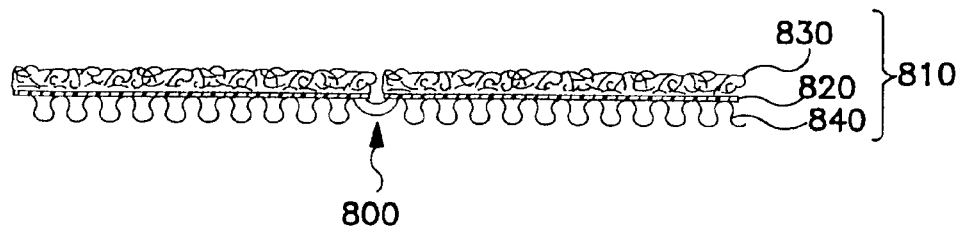
FIG. 7 shows an embodiment of the invention in which a pinhole is sealed by heating the bicomponent layer of the textile laminate.

A further application of the invention is shown in FIG. 7 in which a pinhole 800 is made in a textile laminate 810 comprising a composite layer 820 with a backer fabric 830 on a first side and a bi-component layer 840 on a second side. The pinhole 800 can be sealed by heating the bi-component layer 840 in the region surrounding the pinhole such that the molten low melting temperature component in the bi-component layer 840 seals the pinhole 800. The melting point of the low melting temperature component is defined to be the temperature at which the low melting temperature component flows sufficiently to seal the pinhole 800.

EXAMPLES

Comparative Example A

A 0.7 osy polyamide 6.6 (nylon) spun-bonded non-woven layer was laminated to a waterproof breathable composite layer 5 consisting a polyurethane coated ePTFE membrane 10 using the lamination described above to produce a textile laminates 1. The polyamide layer 30 is available from CEREX Advanced Fabrics in Pensacola, Fla., USA, under the trade name PBNII. The polyamide sides of two pieces of textile laminates 1 are joined together using the Theller Hot Tack Seal Strength Tester. The heat sealing die was 12.7 mm by 133 mm and the actual footprint used measured 12 mm by 131 mm. The top and bottom dies were heated to a temperature of 255° C. and a 5 sec. dwell time was used at a pressure of 300 psi.

Comparative Example B

A 0.8 osy polypropylene spun-bonded non-woven layer was laminated to a waterproof breathable composite layer 5 consisting a polyurethane coated ePTFE membrane 10 using the lamination described above to produce a textile laminates 1. The polypropylene layer is available from Snow Filtration Company in West Chester, Ohio, USA, under the trade name Snopro8. The polypropylene sides of two pieces of textile laminates 1 are joined together using the Theller Hot Tack Seal Strength Tester. The heat sealing die was 12.7 by 133 mm and the actual footprint used was 12 mm by 131 mm. The top and bottom dies were heated to a temperature of 165° C. and a 5 sec. dwell was used at a pressure of 300 psi.

Comparative Example C

A 60 g/m² polyethylene spun-bonded non-woven layer was laminated to a waterproof breathable composite layer 5 consisting of a polyurethane coated ePTFE membrane 10 using the lamination described above to produce a textile laminates 1. The polyethylene layer is available from Snow Filtration Company in West Chester, Ohio, USA, under the trade name Corolind T60F00. The polyethylene sides of two pieces of textile laminates 1 are joined together using the Theller Hot Tack Seal Strength Tester. The heat sealing die was 12.7 by 133 mm and the actual footprint used was 12 mm by 131 mm. The top and bottom dies were heated to a temperature of 130° C. and a 5 sec. dwell was used at 300 psi.

Comparative Example D

A 0.8 osy polyester spun-bonded non-woven layer was laminated to a waterproof breathable composite layer 5 consisting of a polyurethane coated ePTFE membrane using the lamination described above. The polyester layer is available from Snow Filtration Company in West Chester, Ohio, USA, under the trade name Reemay 2011. The polyester sides of two pieces of textile laminates 1 are joined together using the Theller Hot Tack Seal Strength Tester. The heat sealing die was 12.7 by 133 mm and the actual footprint used was 12 mm by 131 mm. The top and bottom dies were heated to a temperature of 255° C. and a 5 sec. dwell was used at a pressure of 300 psi.

Example 1

A 0.8 osy polyethylene (PE)/polyamide (PA) sheath-core spun-bonded bi-component non-woven layer 30 was laminated to a waterproof breathable composite layer 5 consisting of a polyurethane coated ePTFE membrane 10 using the lamination method described above. The bi-component layer 30 was produced by Kimberly-Clark in Roswell, Ga., USA, and is described in U.S. Pat. No. 5,662,978. The bi-component layer 30 sides of the two pieces of textile laminates 1 are joined together using the Theller Hot Tack Seal Strength Tester. The heat sealing die was 12.7 by 133 mm and the actual footprint used was 12 mm by 131 mm. The top and bottom dies were heated to a temperature of 135° C. and a 5 sec. dwell was used at a pressure of 300 psi.

Example 2

A 20 g/m² polyethylene (PE)/polyethylene terephthalate (PET) sheath-core spun-bonded bi-component non-woven layer 30 was laminated to a waterproof breathable composite layer 5 consisting a polyurethane coated ePTFE membrane 10 using the lamination described above to form a textile laminates 1. The bi-component layer 30 was produced by Unitika in Osaka, Japan, and is sold under the brand name ELEVES. The bi-component layer sides of two pieces of textile laminates 1 are joined together using the Theller Hot Tack Seal Strength Tester. The heat sealing die was 12.7 by 133 mm and the actual footprint used measured was 12 mm by 131 mm. The top and bottom dies were and a 5 sec. dwell was used at a pressure of 300 psi.

Example 3

A 0.8 osy. polypropylene (PP)/polyethylene terephthalate (PET) sheath-core carded bi-component non-woven layer 30 was laminated to a waterproof breathable composite layer 5 consisting a polyurethane coated ePTFE membrane 10 using the lamination described above to form a textile laminates 1. The bi-component layer 30 was produced by HDK Industries, Inc., in Rogersville, Tenn., USA, and is sold under part number D1640. The bi-component layer sides of two pieces of textile laminates 1 are joined together using the Theller Hot Tack Seal Strength Tester. The heat sealing die was 12.7 by 133 mm and the actual footprint used measured was 12 mm by 131 mm. The top and bottom dies were heated to a temperature of 165° C. and a 5 sec. dwell time was used at a pressure of 300 psi.

Example 4

A 0.8 osy. PE/polyethylene terephthalate (PET) sheath-core carded bi-component non-woven was laminated to a waterproof breathable composite layer consisting a polyurethane coated ePTFE membrane using the lamination described above. The bi-component layer 30 was produced by HDK Industries, Inc., in Rogersville, Tenn., USA, and is sold under part number style 115. The bi-component sides of two pieces of the Textile laminates 1 are joined together using the Theller Hot Tack Seal Strength Tester. The heat sealing die was 12.7 by 133 mm and the actual footprint used measured was 12 mm by 131 mm. The top and bottom dies were heated to a temperature of 130° C. and a 7 sec. dwell was used at a pressure of 300 psi.

Example 5

A 30 g/m² polyethylene terephthalate (PET)/PE island in the sea bi-component non-woven layer 30 was laminated to a waterproof breathable composite layer 5 consisting a polyurethane coated ePTFE membrane 10 using the lamination described above to form a textile laminates 1. The bi-component layer 30 was produced by Unitika in Osaka, Japan, and is sold under the brand name ALICMA. The bi-component layer sides of two pieces of textile laminates 1 are joined together using the Theller Hot Tack Seal Strength Tester. The heat sealing die was 12.7 by 133 mm and the actual footprint used measured was 12 mm by 131 mm. The top and bottom dies were heated to a temperature of 135° C. and a 5 sec. dwell time was used at a pressure of 300 psi.

Example 6

A 1.0 osy. polyethylene (PE)/polyamide (PA) sheath-core spun-bonded bi-component non-woven layer 30 was laminated to a waterproof breathable composite layer 5 consisting a polyurethane coated ePTFE membrane 10 using the lamination described above to form a textile laminates 11. The bi-component layer 30 was produced by Kimberly-Clark in Rosewell, Ga., USA, and is described in U.S. Pat. No. 5,662,978. The bi-component layer sides of two pieces of textile laminates 1 are joined together using the heat sealing die with 0.1 inch seal width shown in FIG. 4 in the shape of a glove at about 215° C. for 1.5 sec at a pressure of 470 psi to form a glove insert.

Example 7

A third layer 40 of 0.7 osy non-woven nylon (polyamide 6.6) was added to the textile laminates 1 in example 6 using the same lamination technique. The nylon layer was produced by CEREX. Advanced Fabrics in Pensacola, Fla., USA, and sold under the trade name PBN2. The bi-component layer sides of the two pieces of textile laminates 1 are joined together using the heat sealing die with 0.7 mm seal width shown in FIG. 4 in the shape of a glove at about 215° C. for 2.0 sec at a pressure of 470 psi to form a glove insert.

Example 8

A 0.8 osy. polyethylene/polyamide (PA) sheath-core spun-bonded bi-component non-woven layer 30 was laminated to a waterproof breathable composite layer 5 consisting a polyurethane coated ePTFE membrane 10 using the lamination described above to form a textile laminate 1. A third layer 40 of 0.7 osy non-woven nylon (polyamide 6.6) was added to the textile laminate 1 using the same lamination technique. The nylon layer was produced by CEREX Advanced Fabrics in Pensacola, Fla., USA, and is sold under the trade name PBNII. The bi-component layer sides of two pieces of textile laminates 1 are joined together using the heat sealing die with 0.1 inch seal width shown in FIG. 4 in the shape of a glove at a temperature of about 200° C. for a dwell time of 2.0 sec and a pressure of 470 psi to form a glove insert.

Example 9

The textile laminates 1 in example 8 were repeated in which the third layer 40 is 1.8 osy brushed knit available from International Foam. The bi-component layer sides of the two pieces of textile laminate 1 are joined together using the heat sealing die with 0.7 mm seal width shown in FIG. 4 in the shape of a glove at a temperature of about 190° C. for 5 sec. at a pressure of 400 gauge psi to form a glove insert.

Example 10

The textile laminates 1 in example 8 were repeated in which the third layer 40 is 5.5 osy cotton. The bi-component layer sides of two pieces of the textile laminates 1 are joined together using the heat sealing die with 0.1 inch seal width shown in FIG. 4 in the shape of a sock at a temperature of about 230° C. for 10 sec and at a pressure of 440 gauge psi to form a sock.

Example 11

The textile laminates in example 8 were used to form waterproof seams by ultrasonic welding. The bi-component layer sides of the two pieces of textile laminates 1 are joined together using a Branson Ultrasonic Sealer Model FS90 with a 0.5 mm horn to make 0.5 mm seams. An amplitude of 75%, a pressure of 20 psi and speed of 1 were used.

Example 12

The textile laminates in example 9 were used to form waterproof seams by ultrasonic welding. The bi-component sides of two pieces of Textile laminates 1 are joined together using a Branson Ultrasonic Sealer Model FS90 with a 0.5 mm anvil to make 0.5 mm seams. An amplitude of 75%, a pressure of 20 psi and speed of 1 were used.

Example 13

A third layer 40 of 20 g/m² non-woven nylon layer was added to the textile laminates 1 of example 2 using the same lamination technique. The nylon layer 40 was produced by ASAHI in Japan and sold under the trade name N1020. The bi-component layer sides of the two pieces of textile laminates 1 are joined together using the heat sealing die with 1 inch seal width shown in FIG. 4 in the shape of a glove at a temperature of about 200° C. for 7 sec. A pressure of 55 gauge psi was used to form a glove insert.

Example 14

The textile laminate 1 of example 3 was used to make a glove insert. The bi-component layer sides of two pieces of textile laminates 1 are joined together using the heat sealing die with 0.1 inch seal width shown in FIG. 4 in the shape of a glove at a temperature of about 200° C. for 5 sec and a pressure of 55 gauge psi to form a glove insert.

Example 15

A third layer 40 of 0.7 20 g/m² non-woven nylon layer 40 was added to the textile laminate 1 in example 4 using the same lamination technique. The nylon layer 40 was produced by Asahi in Japan and is sold under the trade name N1020. The bi-component sides of two pieces of textile laminate 1 are joined together using the heat sealing die with 0.1 inch seal width shown in FIG. 4 in the shape of a glove at about 200° C. for 7 sec at a pressure of 55 gauge psi to form a glove insert.

Example 16

The textile laminates 1 of Example 5 was used to make a glove insert. The bi-component layer sides of two pieces of the textile laminates 1 are joined together using the heat sealing die with 0.1 inch seal width shown in FIG. 4 in the shape of a glove at about 200° C. for 5 sec at a pressure of 55 gauge psi to form a glove insert.

Example 17

The textile laminates 1 in example 1 were repeated except that the waterproof breathable layer is a waterproof breathable layer of polypropylene. The polypropylene layer is available from Du Pont of Wilmington, Del. under the brand name TYVEK part number 1422A. The bi-component sides of two pieces of textile laminates 1 are joined together using the Theller Hot Tack Seal Strength Tester. The heat sealing die was 12.7 by 133 mm and the actual footprint used measured was 12 mm by 131 mm. The top and bottom dies were heated to 130° C. and a 5 sec. dwell time was used at a pressure of 110 psi.

Example 18

The textile laminates 1 of example 1 were repeated except that the waterproof breathable layer is a waterproof breathable layer of polyurethane. The polyurethane layer is available from B F Goodrich under the brand name ESTHANE. The bi-component sides of two pieces of textile laminates 1 are joined together using the Theller Hot Tack Seal Strength Tester. The heat sealing die was 12.7 by 133 mm and the actual footprint used measured was 12 mm by 131 mm. The top and bottom dies were heated to 135° C. and a 7 sec. dwell time was used at a pressure of 300 psi (Example 18A) and 110 p.s.i. (Example 18B).

Example 19

The textile laminates 1 of example 1 were repeated except that where the waterproof breathable layer is a waterproof breathable layer of polyurethane. The polyurethane layer is described in PCT Application US94/124659. The bi-component layer sides of two pieces of textile laminates 1 are joined together using the Theller Hot Tack Seal Strength Tester. The heat sealing die was 12.7 by 133 mm and the actual footprint used measured was 12 mm by 131 mm. The top and bottom dies were heated to 130° C. and a 7 sec. dwell time was used at a pressure of 110 psi.

Example 20

The textile laminates 1 in example 1 were repeated except that the waterproof breathable layer is a waterproof breathable layer of ePTFE which is not coated with polyurethane. The bi-component layer sides of two pieces of textile laminates 1 are joined together using the Theller Hot Tack Seal Strength Tester. The heat sealing die was 12.7 by 133 mm and the actual footprint used measured was 12 mm by 131 mm. The top and bottom dies were heated to a temperature of 135° C. and a 7 sec. dwell time was used at a pressure of 300 psi.

Example 21

A 0.7 osy non-woven nylon layer 40 was laminated to a waterproof breathable composite layer 5 consisting a polyurethane coated ePTFE membrane 10 using the lamination described above. The nylon layer 40 was produced by CEREX Advances Fabrics in Pensacola, Fla., USA under the trade name PBNII. The bi-component layer side of the textile laminate 1 of example 8 and the nylon side for the textile laminates 1 described here were joined together using the Theller Hot Tack Seal Strength Tester. The heat sealing die was 12.7 by 133 mm and the actual footprint used measured was 12 mm by 131 mm. The top and bottom dies were heated to a temperature of 135° C. and a 5 sec. dwell was used at a pressure of 300 psi.

Results

Polyethylene/Polyamide Bi-Component Layer

Table 2 shows the results of laminating the polyethylene/polyamide bi-component layer of Kimberley-Clark to a variety of membranes.

TABLE 2

| Example No. | Membrane | seam strength (pli) | MVTR (m²/24 hr) Membrane | MVTR (m²/24 hr.) Laminate | Passed Suter Test? |
|---|---|---|---|---|---|
| 17 | Tyvek | 5,8 | 3830 | 3095 | pass |
| 1 | Polyurethane-coated ePTFE | 6,4 | 9536 | 14829 | pass |
| 19 | Polyurethan | 5 | 5647 | 6392 | pass |
| 20 | ePTFE | 5,3 | 14084 | 13019 | pass |
| 18 | Polyurethan | 7.4 (18A)/ 3.1 (18B) | 3472 | 3784 | pass |

The column "passed suter test" indicates whether the seam formed was able to withstand water at a pressure of 2 psi for at least 3 minutes. The seam strength measurements on example 18 were repeated twice as explained above. The better strength was obtained when the higher pressure was used.

Seam Strength and Seam Width

Table 3 shows the seam strength in pounds per linear inch (pli) and the seam width for a number of examples of the patent constructed in the form of a glove, sock or just a seam.

TABLE 3

| Example Number | Object Made | Seam Strength (pli) | WGLT (PSI) | Passed Suter Test? | Seam Width |
|---|---|---|---|---|---|
| 6 | glove | 5,8 | 9 | | 0.1 in |
| 7 | glove | 6,4 | 8 | | 0.7 mm |
| 8 | glove | 5,8 | 14 | | 0.1 in |
| 9 | glove | 9.3 | 14 | | 0.1 in |
| 10 | sock | 5,4 | 6 | | 0.1 in |
| 13 | glove | 5,4 | 11 | | 0.1 in |
| 14 | glove | 5.0 | 8 | | 0.1 in |
| 15 | glove | 5.2 | 11 | | 0.1 in |
| 16 | glove | 5.7 | 6 | | 0.1 in |
| 11 | seam | 7,7 | | pass | 0.5 mm |
| 12 | seam | 9,5 | | pass | 0.5 mm |
| 21 | seam | | | pass | 0.5 in |

WGLT=Whole Glove Leak Test, see U.S. Pat. No. 4,776,209

Measurements on Textile Prior to Formation of Laminate

Table 4 shows measurement made on the raw textiles prior to the formation of the laminate.

TABLE 4

| Example No. | Material | Weight (g/3 × 1 in²) | Thickness (in) | Long. Break (pounds) | Long. (Bulk Tensile Strength (PSI) | Long. Strain (%) | Trans. Break (pounds) | Trans. Bulk Tensile Strength (PSI) | Trans. Strain (% elongate.) | Average Bulk Tensile Strength (PSI) | Trans. Strain (% elong.) |
|---|---|---|---|---|---|---|---|---|---|---|---|
| B | PP | 0.05 | 0.008 | 5.2 | 650 | 57.3 | 3.2 | 400 | 63.8 | 525 | 60.6 |
| C | PE | 0.11 | 0.013 | 6.3 | 485 | 289.5 | 3.6 | 277 | 311.7 | 381 | 300.6 |
| A | PA | 0.05 | 0.006 | 7.9 | 1317 | 74.3 | 4.7 | 783 | 66.7 | 1050 | 70.5 |
| D | PET | 0.06 | 0.008 | 8 | 1000 | 48.2 | 3.6 | 450 | 55.1 | 725 | 51.7 |
| 1 | PE/PA | 0.05 | 0.005 | 9.5 | 1900 | 76 | 4.8 | 960 | 94.1 | 1430 | 85.1 |
| 2 | PE/PET | 0.04 | 0.005 | 9.3 | 1860 | 79.9 | 4.3 | 860 | 76.9 | 1360 | 78.4 |
| 5 | PET/PE | 0.06 | 0.008 | 4.9 | 613 | 29.7 | 2.7 | 338 | 36.6 | 476 | 33.2 |
| 4 | PE/PET | 0.05 | 0.004 | 6.3 | 1575 | 54.5 | 1.7 | 425 | 74.4 | 1000 | 64.5 |
| 3 | PP/PET | 0.05 | 0.003 | 7.7 | 2567 | 37.2 | 3.1 | 1033 | 26.6 | 1800 | 31.9 |
| ePTFE | Not Laminated | 0.06 | 0.001 | 2.2 | 2200 | 188.4 | 4.5 | 4500 | 60.4 | 3350 | |

In table 4, the measurements are made in either the transverse or in the longitudinal direction. These directions are perpendicular to each other and indicate the direction in which the seam (500) in the laminate 1 is to be formed. The longitudinal direction is the direction along the seam (500) whilst the transverse direction is the direction across the seam (500).

Measurements on Laminates

Table 5 shows the results of measurements made on the seams formed in the laminates.

TABLE 5

| Ex. No. | Laminate Weight (g/in²) | Laminate Thickness (in) | Long. Break Strength (lbs) | Long. Bulk Tensile Strength (psi) | Long. Strain (% strain % elong.) | Trans. Break Strength (lbs) | Trans. Bulk Tensile Strength (psi) | Trans. Strain (% strain % elong.) | Av. Bulk Tensile Strength | MVTR |
|---|---|---|---|---|---|---|---|---|---|---|
| B | 0.12 | 0.0096 | 8.2 | 854.2 | 82.3 | 7.4 | 770.8 | 82.8 | 812.5 | 8985 |
| C | 0.18 | 0.0132 | 8.9 | 674.2 | 279 | 6.1 | 462.1 | 107.3 | 568.2 | 9650 |
| A | 0.11 | 0.007 | 9.4 | 1342.9 | 99.6 | 9.0 | 1371.4 | 70 | 1357.1 | 10795 |
| D | 0.11 | 0.009 | 9.4 | 1044.4 | 59.3 | 10.1 | 1511.1 | 73 | 1277.8 | 11276 |
| 1 | 0.14 | 0.009 | 12.1 | 1344.4 | 122.4 | 8.0 | 988.9 | 99.5 | 1166.7 | 9750 |
| 2 | 0.10 | 0.006 | 13 | 2166.7 | 91.2 | 8.9 | 2283.3 | 85.3 | 2225.0 | 10912 |
| 5 | 0.11 | 0.008 | 5.5 | 687.5 | 41.9 | 8.8 | 1612.5 | 41 | 1150.0 | 9159 |
| 4 | 0.13 | 0.0046 | 9.3 | 2021.7 | 66.4 | 6.8 | 1478.3 | 67.8 | 1750.0 | 9912 |
| 3 | 0.12 | 0.0042 | 10.6 | 2523.8 | 47.5 | 9.3 | 2214.3 | 53.1 | 2369.0 | 10352 |

Measurements on Seams

Table 6 shows the results of measurements made on the seams formed in the laminates. A three inch by one inch sample was used.

TABLE 6A

| Ex. No. | Seam Weight | Seam Thickness (in) | Seam Long. Break Strength (lbs) | Seam Long. Bulk Tensile Strength (PSI) | Seam Long. Strain (% elong.) | Seam Trans. Break Strength (lbs) | Seam Trans. Bulk Tensile Strength (psi) | Seam Trans. Strain (% elong.) | Seam Av. Bulk Tensile Strength (psi) | Seam Av. Strain (% elong. At break) |
|---|---|---|---|---|---|---|---|---|---|---|
| B | 0.25 | 0.0073 | 15.2 | 2082 | 58 | 15.4 | 2110 | 57 | 2096 | 58 |
| C | 0.4 | 0.0123 | 14.3 | 1163 | 277.6 | 14.3 | 1163 | 88.2 | 1163 | 183 |
| A | 0.23 | 0.008 | 18.4 | 2300 | 89.2 | 22.4 | 2800 | 78.1 | 2550 | 84 |
| D | 0.23 | 0.005 | 17.4 | 3480 | 64.2 | 20.9 | 4180 | 69.7 | 3830 | 67 |
| 1 | 0.28 | 0.007 | 28.6 | 4086 | 130.5 | 21.2 | 3029 | 117.3 | 3557 | 124 |
| 2 | 0.21 | 0.005 | 28 | 5600 | 94.9 | 20.8 | 4160 | 86.8 | 4880 | 91 |
| 5 | 0.23 | 0.005 | 17.2 | 3440 | 56.9 | 19.2 | 3840 | 44 | 3640 | 50 |
| 4 | 0.24 | 0.006 | 19.3 | 3217 | 76.1 | 14 | 2333 | 78.9 | 2775 | 78 |
| 3 | 0.23 | 0.005 | 21.4 | 4280 | 48.3 | 17.8 | 3560 | 50.5 | 3920 | 49 |

TABLE 6B

| Ex. No. | Seam Shrinkage (%) | Seam Strength (pli) | Suter Test on 1 in. Seam | Suter Test on 0.5 in Seam | Width of Seam (mm) | Length of Seam (mm) |
|---|---|---|---|---|---|---|
| B | 7.1 | 3.2 | 3 pass | 3 pass | 11.6 | 125.8 |
| C | 2.2 | 3.2 | 3 pass | 3 pass | 12.0 | 128.2 |
| A | 20.5 | 7.7 | 3 pass | 3 pass | 10.1 | 123.8 |
| D | 17.5 | 6 | 3 pass | 3 pass | 10.3 | 125.5 |
| 1 | 5 | 6–7 | 3 pass | 3 pass | 11.6 | 128.7 |
| 2 | 5.5 | 5 | 0 pass | 3 pass | 11.5 | 129.2 |
| 5 | 3.3 | 3.3 | 3 pass | 3 pass | 11.8 | 128.8 |
| 4 | 5.2 | 5.8 | 3 pass | 3 pass | 11.6 | 128.5 |
| 3 | 4.1 | 5.1 | 3 pass | 3 pass | 11.7 | 128.8 |

It will be observed from this table that the seam shrinkage of the examples 1–5 is low compared to that of the comparative examples A and D.

Cantilever Test

This test is designed to measure the stiffness of the laminate and the results are shown in Table 7.

TABLE 7

| Ex. No. | Seam Long. cantilever width mm | Seam Long. cantilever thickness mm | Seam Long. cantilever test cm | Seam Long. cantilever 1/mm | Seam Trans. cantilever width mm | Seam Trans. cantilever thickness mm | Seam Trans. cantilever test cm | Seam Trans. cantilever 1/mm | Seam Av. cantilever 1/mm |
|---|---|---|---|---|---|---|---|---|---|
| B | 12 | 0.18 | 9.9 | 45.83 | 11.8 | 0.18 | 9.6 | 45.20 | 45.5 |
| C | 12.2 | 0.23 | 10.3 | 36.71 | 12 | 0.23 | 11.4 | 41.30 | 39.0 |

TABLE 7-continued

| Ex. No. | Seam Long. cantilever width mm | Seam Long. cantilever thickness mm | Seam Long. cantilever test cm | Seam Long. cantilever 1/mm | Seam Trans. cantilever width mm | Seam Trans. cantilever thickness mm | Seam Trans. cantilever test cm | Seam Trans. cantilever 1/mm | Seam Av. cantilever 1/mm |
|---|---|---|---|---|---|---|---|---|---|
| A | 10 | 0.14 | 7.7 | 55.00 | 10.6 | 0.14 | 7.4 | 49.87 | 52.4 |
| D | 11 | 0.13 | 10.7 | 74.83 | 10.6 | 0.12 | 9.3 | 73.11 | 74.0 |
| 1 | 12.1 | 0.17 | 7.3 | 35.49 | 11.7 | 0.17 | 6.9 | 34.69 | 35.1 |
| 2 | 12 | 0.13 | 6.1 | 39.10 | 12.2 | 0.14 | 7.5 | 43.91 | 41.5 |
| 5 | 11.8 | 0.14 | 6.4 | 38.74 | 11.8 | 0.15 | 6.6 | 37.29 | 38.0 |
| 4 | 12.1 | 0.16 | 7.5 | 38.74 | 11.4 | 0.16 | 6.6 | 36.18 | 37.5 |
| 3 | 12.1 | 0.14 | 7.8 | 46.04 | 11.4 | 0.14 | 7.2 | 45.11 | 45.6 |

The result in the last column is indicative of the stiffness of the seam 500. It will be observed that the examples with the bi-component layers 30 have a lower average cantilever measurement (stiffness) than the comparative examples. Comparative example C and B do have a low average cantilever measurement. It will be seen, however, from table 6 that the seam transverse breaking strength (3.2 lbs) is comparatively low. Comparative example A has a low average cantilever measurement, although a higher value than the measurements on examples 14. The seam shrinkage (table 6B) is, however, 20.5% which is high.

What is claimed is:

1. A combination of a laminate (400) and a substrate (450, 650) comprising
   a waterproof substrate (450, 650); and
   a laminate (400) joined to said substrate (450, 650) at a waterproof seam (500), the laminate (400) having
   a first layer (5) comprising a waterproof functional layer (10, 20), and
   a second layer (30) laminated to said first layer (5), the second layer including a plurality of yarns having at least a bicomponent structure of at least a first component and a second component, the first component being stable to a first temperature and the second component melting at a second temperature, wherein the first temperature is higher than the second temperature and wherein the second component has been heated and melted to form the waterproof seam between the laminate and the waterproof substrate.

2. The combination of claim 1, whereby the seam (500) withstands a water entry pressure of at least 0.07 bar.

3. The combination of claim 1, whereby the seam (500) withstands a water entry pressure of at least 0.13 bar.

4. The combination of claim 1, whereby the stiffness of the seam (500) is less than 50 mm$^{-1}$.

5. The combination of claim 1, whereby the shrinkage of the seam (500) is less than 7%.

6. The combination of claim 1, whereby the seam (500) has a width less than 0.25 cm.

7. The combination of claim 1, whereby the seam (600) has an elongation strain at break of greater than 75%.

8. The combination of claim 1, whereby the seam (500) has a transverse seam strength of greater than 3 pli.

9. The combination of claim 1, whereby the second layer (30) further includes a propellant which is activatable by activation means.

10. The combination of claim 9, wherein the propellant is selected from the group of propellants consisting of azodicarbonamide, ammonium hydrogen carbonate, toluolsulfohydrazin or diazoaminobenzol.

11. The combination of claim 10, wherein the propellant is azodicarbonamide.

12. The combination of claim 9, wherein the propellant after activation generates a closed cell foam with the second component after melting.

13. The combination of claim 9, wherein the propellant is activated at a temperature between the second temperature and the first temperature.

14. The combination of claim 9, wherein the propellant is an integral part of the second component.

15. The combination of claim 1, whereby the second component melts at a temperature In the range of from 80° C. to 170° C.

16. The combination of claim 1, whereby the first component does not melt below a temperature of 140° C.

17. The combination of claim 1, whereby the first component does not disintegrate below a temperature of 140° C.

18. The combination of claim 1, whereby the difference in temperature between the first temperature and the second temperature is at least 20° C.

19. The combination of claim 1, wherein the second layer (30) is a knitted, woven or non-woven layer.

20. The combination of claim 1, wherein the first component is selected from the group of polymers comprising polyolefins, polyester, copolyester, polyamide, coolyamide, cellulose or protein fibers.

21. The combination of claim 20, wherein the first component is polyamide 6.6.

22. The combination of claim 20, wherein the first component is a polyolefin selected from polypropylene and polyethylene.

23. The combination of claim 20, wherein the first component is a protein fiber selected from wool and silk.

24. The combination of claim 1, wherein the second component is a thermoplastic.

25. The combination of claim 24, wherein the second component is selected from the group of thermoplastics comprising co-polyester, polyamide, co-poyamide or polyolefin.

26. The combination of claim 25, wherein the second component is a polyethylene.

27. The combination of claim 25, wherein the second component is a polyamide 6.

28. The combination of claim 25 wherein the second component is a polypropylene.

29. The combination of claim 1, wherein the yarn has a cover-core structure, wherein the second component forms the cover.

30. The combination of claim 1, wherein the yarn has a "side-by-side" structure.

31. The combination of claim 1, wherein the second layer is a blend of said plurality of yarns.

32. The combination of claim 1, wherein the yarn is comprised of fibers.

33. The combination of claim 1, wherein the functional layer (5) is a membrane or a film.

34. The combination of claim 33, wherein the functional layer (5) is selected from the group of materials consisting of polyesters, polyamide, polyolefins, polyvinylichloride, polyketones, polysutfones, polycarbonates, fluaropolymers, polyacrylates, poiyurethanes, co-polyetheresters, and co-polyetheramides.

35. The combination of claim 34, wherein the functional layer (5) Is made from expanded PTFE.

36. The combination of claim 34, wherein the functional layer is polytetrafluoroethylene (PTFE).

37. The combination of claim 1, wherein the MVTR of the laminate (400) is less than 150 RET.

38. The combination of claim 1, wherein the water entry pressure of a laminate (400) is greater than 0.13 bar.

39. Articles of clothing made from the combination of claim 1.

40. The combination of claim 1 wherein the waterproof substrate comprises at least a waterproof laminate (400, 450), having a functional layer (10, 20) laminated to a textile layer (30) wherein the waterproof seam (500) has a transverse seam strength of greater than 3 pli and an elongation strain at break greater than 75%.

41. The combination of claim 40, wherein the seam (500) has a width of less than 0.25 cm.

42. The combination of claim 40, wherein the stiffness of the seam (500) is less than 50 mm$^{-1}$.

43. The combination of claim 40, wherein the seam (500) withstands water pressure of 0.13 bar for at least three minutes.

44. The combination of claim 40, wherein the seam (500) shrinks by less than 7% after welding.

45. The combination of claim 1 wherein the waterproof substrate comprises at least a waterproof laminate (400, 450), having a functional layer (10, 20) laminated to a textile layer (30), wherein the waterproof seam (500) has a transverse seam strength of greater than 3 pli and wherein the stiffness of the seam (500) is less than 50 mm$^{-1}$.

46. The combination of claim 45, wherein the seam (500) has a width of less than 0.25 cm.

47. The combination of claim 45, wherein elongation strain at break is greater than 75%.

48. The combination of claim 45, wherein the seam (500) withstands a water pressure of 0.13 bar for at least three minutes.

49. A combination of two laminates (400, 450, 650) joined together at a waterproof seam (500), each of the laminates (400, 450, 650) comprises:
   a first layer (5) comprising a waterproof functional layer (10, 20), and
   a second layer (30) laminated to said first layer (5), the second layer including a plurality of yarns having at least a bicomponent structure of at least a first component and a second component, the first component being stable to a first temperature and the second component melting at a second temperature wherein the first temperature is higher than the second temperature, and wherein the second component has been heated and melted to form the waterproof seam between the two laminates.

50. The combination of claim 49, whereby the seam (500) withstands a water entry pressure of at least 0.13 bar.

51. The combination of claim 49, whereby the seam (500) has a width less than 0.25 cm.

52. The combination of claim 49, whereby the seam (500) has an elongation strain at break of greater than 75%.

53. The combination of claim 49, whereby the seam (500) has a transverse seam strength of greater than 3 pli.

54. The combination of claim 49, whereby the stiffness of the seam (500) is less than 50 mm$^{-1}$.

55. The combination of claim 49, whereby the shrinkage of the seam (500) is less than 7%.

56. The combination of claim 49, whereby the second layer further includes a propellant which is activatable by activation means.

57. The combination of claim 56, wherein the propellant after activation generated a closed cell foam with the second component after melting.

58. The combination of claim 56, wherein the propellant is activated at a temperature between the second temperature and the first temperature.

59. The combination of claim 56, wherein the propellant is an integral part of the second component.

60. The combination of claim 56, wherein the propellant is selected from the group of propellants consisting of azodicarbonamide, ammonium hydrogen carbonate, toluoisulfohydrazin or diazoaminobenzol.

61. The combination of claim 60, wherein the propellant is azodicarbonamide.

62. The combination of claim 49, whereby the second component melts at a temperature in the range of from 80° C. to 170° C.

63. The combination of claim 49, whereby the first component does not melt below a temperature of 140° C.

64. The combination of claim 49, whereby the first component does not disintegrate below a temperature of 140° C.

65. The combination of claim 49, whereby the difference in temperature between the first temperature and the second temperature is at least 20° C.

66. The combination of claim 49, wherein the first component is selected from the group of polymers comprising cellulose, protein fibers, polyolefins, polyester, co-polyester, polyamide, and co-polyamide.

67. The combination of claim 66, wherein the first component is polyamide 6.6.

68. The combination of claim 66, wherein the first component is a polyolefin selected from polypropylene and polyethylene.

69. The combination of claim 66, wherein the first component is a protein fiber selected from wool and silk.

70. The combination of claim 49, wherein the second components is a thermoplastic.

71. The combination of claim 70, wherein the second component is selected from the group of thermoplastics comprising co-polyester, polyamide, co-polyamide and polyolefin.

72. The combination of claim 71, wherein the second component is a polyethylene.

73. The combination of claim 71, wherein the second component Is a polyamide 6.

74. The combination of claim 70, wherein the second component is a polyolefin selected from polypropylene and polyethylene.

75. The combination of claim 49, wherein the yarn has a sheath-core structure, wherein the second component forms the cover.

76. The combination of claim 49, wherein the yarn has a "side-by-side" structure.

77. The combination of claim 49, wherein the yarn is comprised of fibers.

78. The combination of claim 49, wherein the functional layer (5) Is a membrane or a film.

79. The combination of claim 78, wherein the functional layer (5) Is selected from the group of materials consisting of polyesters, polyamide, polyolefins, polyvinylichloride, polyketones, polysulfones, polycarbonates, fluoropolymers, polyacrylates, polyurethanes, co-polyetheresters, and co-polyetheramides.

80. The combination of claim 79, wherein the functional layer (5) is made from expanded PTFE.

81. The combination of claim 78, wherein the functional layer is polytetrafluoroethylene (PTFE).

82. The combination of claim 49, wherein the MVTR of the laminate (1) is greater than 3000 m³/24 hr.

83. The combination of claim 49, wherein the water entry pressure of a laminate (1) is greater than 0.13 bar.

84. The combination of claim 49 in a garment.

85. A combination of a laminate (400) and a substrate (450, 650) comprising;

a waterproof substrate (450, 660); and a laminate (400) joined to the substrate (45), 650) at a waterproof seam (500), the laminate (400) having a first layer (5) comprising a waterproof functional layer (10, 20), and a second layer (30) laminated to the first layer (5) and comprising at least a first component, a second component and a propellant which is activatable by activation means, the first component being stable to a first temperature and the second component melting at a second temperature, wherein the first temperature is higher than the second temperature and wherein the second component has been heated and melted to form the waterproof seam between the laminate and the waterproof substrate.

* * * * *